Jan. 19, 1932. F. C. FANTZ 1,841,577
RETURN BEND
Filed Sept. 14, 1929
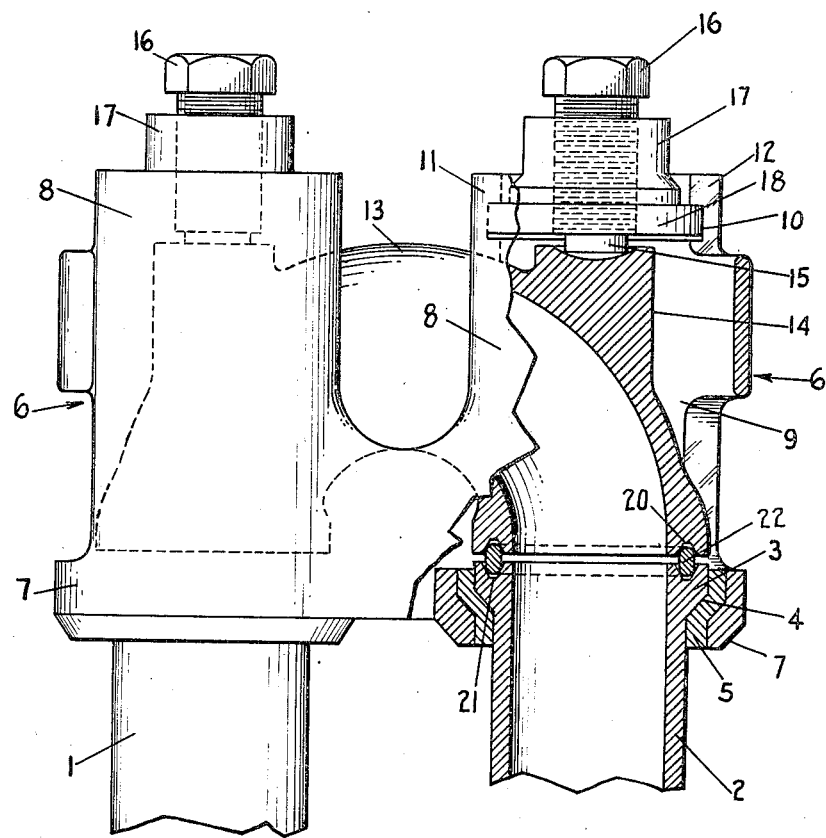
INVENTOR
FRED C. FANTZ
BY
*Harry Lea Dodson*
ATTORNEY Patented Jan. 19, 1932

1,841,577

UNITED STATES PATENT OFFICE

FRED C. FANTZ, OF WEBSTER GROVES, MISSOURI

RETURN BEND

Application filed September 14, 1929. Serial No. 392,515.

My invention relates to that class of return bends described in my Patent No. 1,752,351, issued April 1, 1930, in which I have shown a return bend for cracking stills, which is designed to resist the high pressure and temperature to which devices of this kind are subjected.

As illustrated in that case, I show a pair of tubes which are fitted to annular grooves formed in the face of the return bend proper.

My present invention is designed as an improvement on the method of forming these joints. These joints have to be susceptible of sustaining extremely high pressure, and consequently have to be very accurate.

My present invention has for its object, to provide a type of joint which will not be easily destroyed or injured in removing or cleaning the tubes.

My means for accomplishing the foregoing object may be more readily understood by reference to the accompanying drawing, which is hereto annexed and is a part of this specification, in which—

The figure is a side elevation of my return bend, a portion of the wall being broken away to show the construction of my improved joint.

Similar reference numerals refer to similar parts throughout the entire description.

In the drawing I show only a fragmentary portion of tubes 1 and 2, as obviously these form no part of my invention; and I shall describe only the joint for tube 2, it being understood that an identical joint will be employed for tube 1.

As shown in the drawing, the end 3 of tube 2 is expanded outwardly, to form a shoulder 4. An annular metal bushing 5, which is formed in sections to facilitate its positioning, is mounted intermediate the outside of the tube 2 and the inside of an annular portion 7 connected to a yoke 6, and engages the shoulder 4, there being two such annular portions connected by the yoke. The yoke 6 may be formed in a single piece as shown, or it may be formed in two pieces if desired, as shown in Figs. 5 to 7 in my application hereinbefore mentioned.

Each annular portion 7 of the yoke 6 has upwardly-extending segmental side walls 8 and 9. Slots 10 are formed in the inner surface of these side walls 8 and 9, adjacent their upper ends 11 and 12.

A return bend 13 has cast or formed on its exterior wall two abutments 14, each of which is adapted to be engaged by the end 15 of a set screw 16, which is mounted in a movable plate 17. This plate 17 is provided with two radially-extending arms 18, which are fitted to the slots 10 in the segmental side walls 8 and 9 of each annular portion 7 formed on the yoke 6. It is obvious there are two movable plates 17, one for each tube, and two set screws 16.

As illustrated, I have provided annular grooves 20 in the face of the return bend 13, adjacent each of its outlets the walls surrounding these outlets are thickened to furnish the requisite strength. A corresponding groove 21 is formed on the face of the upset portion on the tube 2. In this groove 21 I mount an annular gasket 22, of some other suitable material.

In assembling the device, tubes 1 and 2 are placed in the nest or bank; the annular portions 7 which are connected by the yoke 6 are passed over the thickened ends 3 of the tubes 1 and 2; the sections of the metal bushing 5 are then placed intermediate the tubes 1 and 2 and the shoulders 4 on the annular portions 7 of the yoke 6; the return bend 13 is then placed intermediate the segmental side walls 8 and 9 formed on the annular portions 7 of the yoke 6, with the annular grooves 20 on the face of said return bend 13 engaging the gasket 22 mounted in the groove 21 formed in the face of the pipes or tubes 1 and 2; the movable plates 17 are then placed so that their arms 18 and 19 extend into the spaces between the segmental side walls 8 and 9. Then, by adjusting the movable plates 17 so that their arms 18 and 19 register with the slots 10 in the side walls 8 and 9, and tightening the set screws 16, it is obvious the annular members 7 of the yoke 6 will be drawn upwardly, and in turn the bushings 5 will be caused to tightly engage the shoulders 4 on the ends of the tubes 1 and 2. At the same time, as clearly seen from the drawing, this will press the return bend 13 down tightly against the gasket 22, which will be forced into the grooves 20 and 21, thereby forming a perfectly tight joint.

It will be apparent, from the foregoing description, that when the return bend 13 is removed, there is no risk whatever of the joint being injured in any way, as all that is necessary is to insert a new gasket 22, and a perfectly tight joint is insured.

Having described my invention, what I regard as new, and desire to secure by Letters Patent of the United States, is:

In a return bend having a housing consisting of annular portions which encircle the thickened ends of a pair of tubes, said annular portions having upwardly extending segmental side walls, a return bend mounted in said housing and detachable means mounted in said side walls which engage said return bend, means to provide a substantially unbroken interior surface for the joint between said tube and said return bend, comprising an upset end on each tube which corresponds in wall thickness to the face of the return bend, there being mating grooves in the face of the return bend and the tubes, and a sealing gasket in said groove whereby the tightening of said detachable means forces the walls of the grooves against said gasket for forming a tight joint.

FRED C. FANTZ.